US012736620B2

(12) United States Patent
Ruppelt et al.

(10) Patent No.: US 12,736,620 B2
(45) Date of Patent: Sep. 15, 2026

(54) METHOD FOR ASSIGNING INFORMATION CHANNELS OF AT LEAST TWO SENSORS, EACH MOUNTED IN DEFINED MOUNTING POSITIONS RELATIVE TO ONE ANOTHER, TO A DETECTION DEVICE

(71) Applicant: VALEO SCHALTER UND SENSOREN GMBH, Bietigheim-Bissingen (DE)

(72) Inventors: Frank Ruppelt, Bietigheim-Bissingen (DE); Christian Sturm, Bietigheim-Bissingen (DE); Vedran Kovacevic, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 287 days.

(21) Appl. No.: 18/578,311

(22) PCT Filed: Jun. 29, 2022

(86) PCT No.: PCT/EP2022/067829
§ 371 (c)(1),
(2) Date: Jan. 11, 2024

(87) PCT Pub. No.: WO2023/285141
PCT Pub. Date: Jan. 19, 2023

(65) Prior Publication Data

US 2024/0319333 A1 Sep. 26, 2024

(30) Foreign Application Priority Data

Jul. 12, 2021 (DE) ..................... 10 2021 117 909.2

(51) Int. Cl.
*G01S 7/40* (2006.01)
*G01S 13/931* (2020.01)

(52) U.S. Cl.
CPC ............ *G01S 7/403* (2021.05); *G01S 7/4091* (2021.05); *G01S 13/931* (2013.01)

(58) Field of Classification Search
CPC ...... G01S 7/403; G01S 7/4091; G01S 13/931; G01S 1/045; G01S 13/88; G01S 5/0221;
(Continued)

(56) References Cited

U.S. PATENT DOCUMENTS 5,933,109 A * 8/1999 Tohya .................. H01Q 1/3233
342/175
5,966,092 A * 10/1999 Wagner ................. G01S 13/424
342/146

(Continued)

FOREIGN PATENT DOCUMENTS

CN 103842843 A * 6/2014 ............. G01S 7/025
DE 10116278 A1 * 10/2002 ........... G01S 7/4972

(Continued)

OTHER PUBLICATIONS

International Search Report issued in corresponding German Patent Application No. DE 10 2021 117 909.2 mailed Mar. 18, 2022 (5 pages).

(Continued)

*Primary Examiner* — Nuzhat Pervin
(74) *Attorney, Agent, or Firm* — Osha Bergman Watanabe & Burton LLP

(57) ABSTRACT

The present invention relates to a method for assigning information channels of at least two sensors to a detection device on the part of at least one control device of the detection device. Each sensor is mounted in defined mounting positions relative to one another. The detection device. The detection device is provided for monitoring at least one monitoring area in connection with at least one vehicle. The method includes emitting at least one scanning signal into at
(Continued)

least one monitoring area, receiving at least one echo signal of at least one scanning signal reflected on at least one object target of at least one object, determining at least one direction variable using at least one echo signal, assigning at least one information channel of at least one of the mounting positions of the sensors, in addition to further steps.

13 Claims, 2 Drawing Sheets

(58) Field of Classification Search
CPC ...... G01S 5/0247; G01S 7/024; G01S 13/003; G01S 13/878; G01S 2013/93275; G01S 7/4086; G01S 7/282; G01S 2013/466
USPC ........................................................ 342/173
See application file for complete search history.

(56) References Cited

U.S. PATENT DOCUMENTS

| | | | | |
|---|---|---|---|---|
| 9,902,399 | B2 * | 2/2018 | Torii | B60W 60/0059 |
| 10,318,822 | B2 * | 6/2019 | Gao | G08G 1/202 |
| 10,810,877 | B2 * | 10/2020 | Fukunaga | G08G 1/166 |
| 11,874,370 | B2 * | 1/2024 | Löffler | G01S 13/87 |
| 11,875,685 | B2 * | 1/2024 | Okuyama | G08G 1/096741 |
| 12,000,950 | B2 * | 6/2024 | Schoor | G01S 7/295 |
| 12,013,464 | B2 * | 6/2024 | Li | G01S 17/10 |
| 2007/0241955 | A1 * | 10/2007 | Brosche | G01S 7/292<br>356/614 |
| 2018/0106888 | A1 * | 4/2018 | Heuel | G01S 13/34 |
| 2018/0340774 | A1 * | 11/2018 | Rastegar | G01S 5/0247 |
| 2019/0077412 | A1 * | 3/2019 | Van Dijk | B60R 11/04 |
| 2021/0080575 | A1 * | 3/2021 | Nehmadi | G01C 21/3602 |
| 2025/0370120 | A1 * | 12/2025 | Kim | G01S 13/867 |

FOREIGN PATENT DOCUMENTS

| | | | | | |
|---|---|---|---|---|---|
| DE | 10138001 | A1 | | 2/2003 | |
| DE | 102008009651 | A1 | | 8/2009 | |
| DE | 102008000571 | A1 | | 9/2009 | |
| DE | 102014224509 | B3 | * | 12/2015 | G01S 15/931 |
| DE | 102016004305 | A1 | | 10/2017 | |
| DE | 102019204604 | A1 | | 10/2020 | |
| EP | 3081959 | A1 | | 10/2016 | |
| EP | 3136123 | A1 | * | 3/2017 | G01S 13/931 |
| EP | 3227712 | B1 | * | 7/2019 | G01S 7/4004 |
| EP | 3584135 | A1 | * | 12/2019 | G08G 1/096725 |
| EP | 3971607 | A1 | * | 3/2022 | G01S 7/4972 |
| GB | 2330968 | A | * | 5/1999 | G01S 13/48 |
| KR | 10-2014-0066405 | A | | 6/2014 | |
| WO | WO-2011047899 | A1 | * | 4/2011 | G01S 5/0247 |
| WO | WO-2012113366 | A1 | * | 8/2012 | G01S 13/931 |

OTHER PUBLICATIONS

International Search Report issued in corresponding International Application No. PCT/EP2022/067829 mailed Oct. 24, 2022 (5 pages).

Written Opinion issued in corresponding International Application No. PCT/EP2022/067829 mailed Oct. 24, 2022 (9 pages).

Office Action issued in corresponding China Application No. 202280049324.7, dated Apr. 11, 2026. (24 pages).

* cited by examiner

METHOD FOR ASSIGNING INFORMATION CHANNELS OF AT LEAST TWO SENSORS, EACH MOUNTED IN DEFINED MOUNTING POSITIONS RELATIVE TO ONE ANOTHER, TO A DETECTION DEVICE

TECHNICAL FIELD

The invention relates to a method for assigning information channels of at least two sensors, each mounted in defined mounting positions relative to one another, to a detection device on the part of at least one control device of the detection device, wherein the detection device is provided for monitoring at least one monitoring area, in particular in connection with at least one vehicle, in which at least one scanning signal is emitted into at least one monitoring area using at least one of the sensors, at least one echo signal of at least one scanning signal reflected on at least one object target of at least one object in at least one monitoring area is received using at least two of the sensors, at least one direction variable, which characterizes a respective direction of a reflective object target relative to at least one reference area of the detection device, is determined by means of at least one echo signal, at least one information channel is assigned to at least one of the mounting positions of the sensors by means of at least one direction variable.

Furthermore, the invention relates to a detection device for monitoring at least one monitoring area, in particular in connection with at least one vehicle, having at least two sensors which are arranged in defined mounting positions relative to one another, having at least one control device, which can communicate with the sensors via respective information channels, and having at least one assignment means for assigning at least one of the information channels to at least one of the mounting positions of one of the sensors.

Furthermore, the invention relates to a vehicle having at least one detection device for monitoring at least one monitoring area, wherein the at least one detection device has at least two sensors which are arranged in defined mounting positions relative to one another, at least one control device, which can communicate via respective information channels with the sensors, and at least one assignment means for assigning at least one of the information channels to at least one of the mounting positions of one of the sensors.

PRIOR ART

A method for determining a respective installation position of at least two sensors of a motor vehicle is known from EP 3 081 959 A1, in which data are received from the at least two sensors, which are arranged on and/or in the motor vehicle, by means of a control device of the motor vehicle. During a movement of the motor vehicle relative to at least one object, relative values are progressively determined using each of the at least two sensors, which describe a respective distance and/or a respective relative velocity between the sensor and the at least one object. Furthermore, the respective installation position of the at least two sensors is determined on the basis of the relative values determined using the at least two sensors. In order that the measurement signals can be evaluated accordingly using the control device, the position or the installation position of each individual sensor has to be known to the control device. Moreover, it is advantageous if a change over time of a position of the at least one object is determined and the respective installation position of the at least two sensors is determined on the basis of the change over time of the position of the at least one object. In addition to the distance to the at least one object, the position of the at least one object can also be determined. The position of the at least one object can be determined, for example, by means of triangulation. In this way, in addition to the distance to the object, an angle between a reference line and the object can also be determined. An unambiguous assignment of the object to one of the sensors can be carried out on the basis of the determined position of the object in the surroundings of the motor vehicle.

The invention is based on the object of designing a method, a detection device, and a vehicle of the type mentioned at the outset in which an assignment of information channels of sensors and defined mounting positions can be improved, in particular the assignment can be carried out more easily, accurately, reliably, and/or cost-effectively.

DISCLOSURE OF THE INVENTION

The object is achieved according to the invention in the method in that for at least two of the sensors and their respective information channels, at least one respective sensor direction variable is determined in each case by means of the respective received echo signals, which characterizes at least one direction of at least one object target detected using the respective sensor relative to a sensor reference area of the respective sensor, by means of in each case at least one sensor direction variable at least one sensor structure for at least one part of the information channels of the at least two sensors is determined, which characterizes the relative positions of the at least two sensors to one another, at least one sensor structure and at least one position structure are compared, wherein the at least one position structure characterizes relative positions of at least one part of the defined mounting positions to one another, and at least one information channel is assigned to at least one of the mounting positions of the sensors from the comparison of the at least one sensor structure and the at least one position structure.

According to the invention, respective echo signals of object targets of objects, which are located in the monitoring area, are detected using the sensors. At least one sensor direction variable is determined for the sensors and their respective information channels from the at least one echo signal respectively received thereby. The sensor direction variables each characterize at least one direction of at least one detected object target relative to a sensor reference area of the corresponding sensor.

The sensor direction variables can advantageously be determined on the part of the sensors and can be transmitted via the respective information channels at the at least one control device. Alternatively, reception signals, which are generated using the sensors from the respective received echo signals, can be transmitted via the respective information channels to the at least one control device. The respective sensor direction variables can be determined using the at least one control device.

An object target in the meaning of the invention is an area of an object at which scanning signals can be reflected. An object can have one or more object targets. Accordingly, echo signals having different main propagation directions can originate from one object.

At least one sensor structure for the information channels of the at least two sensors is determined by means of at least one sensor direction variable. The sensor structure characterizes the relative positions of the at least two sensors to one another.

The at least one sensor structure is compared to at least one position structure between the defined mounting positions. The position structure characterizes the relative positions between the defined mounting positions to one another.

The information channels are assigned to the defined mounting positions by means of the comparison of the at least one sensor structure and the at least one position structure.

In the method according to the invention for assigning the information channels, it is only necessary to determine sensor direction variables, which characterize the direction of detected object targets relative to the respective sensor. In contrast to the method known from the prior art, it is not necessary in the method according to the invention to determine relative distances and/or relative velocities of object targets. In this way, the scanning signals and the received echo signals do not have to be brought into correlation in the method according to the invention. The sensors can be operated in an unsynchronized manner.

Using the method according to the invention, the assignment can also be carried out in static situations, in particular with unmoving detection device and/or unmoving objects. In contrast thereto, in the method known from the prior art, the detection device, or the sensors, respectively, have to be moved relative to the objects to be detected. The method according to the invention can also be carried out for maintenance purposes or after an installation of the detection device on or in a carrier system, in particular a vehicle, a machine, or the like. Alternatively or additionally, the method according to the invention can also be carried out in dynamic situations, in particular with moving detection device and/or moving objects. The method according to the invention can also be carried out during normal operation of the detection device.

The detection device can advantageously be a radar system. Scanning signals in the form of radar signals can be emitted into the monitoring area using a radar system. Alternatively, the detection device can be an optical detection system, in particular a LiDAR system. The sensors of the optical detection system can be designed here so that direction variables can be determined using them solely from echo signals without reference to the scanning signals inducing the echo signals.

The detection device, in particular the radar system, can advantageously have multiple sensors, in particular radar sensors. In this way, the at least one monitoring area can be better monitored.

At least one sensor, in particular at least one radar sensor, can advantageously have at least one emitting device and at least one receiving device. In this way, scanning signals, in particular radar signals can be emitted and echo signals can be received using the sensor.

The invention can advantageously be used in vehicles, in particular motor vehicles. The invention can advantageously be used in land vehicles, in particular passenger vehicles, trucks, buses, motorcycles or the like, aircraft, in particular drones, and/or watercraft. The invention can also be used in vehicles that can be operated autonomously or at least semiautonomously. However, the invention is not restricted to vehicles. It can also be used in stationary operation, in robotics and/or in machines, in particular construction or transport machinery, such as cranes, excavators or the like.

The detection device can advantageously be connected to at least one electronic control device of a vehicle or machine, in particular a driver assistance system or the like, or can be part of such a control device. In this way, at least a part of the functions of the vehicle or of the machine can be performed autonomously or semiautonomously.

The detection device can be used for detecting stationary or moving objects, in particular vehicles, persons, animals, plants, obstacles, roadway irregularities, in particular potholes or rocks, roadway boundaries, traffic signs, open spaces, in particular parking spaces, precipitation or the like, and/or movements and/or gestures.

In one advantageous embodiment of the method, a scanning signal can be emitted in at least one assignment sequence using only one of the sensors and/or no scanning signal can be emitted in at least one assignment sequence using at least one of the sensors and/or at least one of the sensors, in particular at least one of the non-emitting sensors, can be operated in reception readiness for echo signals in at least one assignment sequence.

An assignment sequence in the meaning of the invention includes the emission of a scanning signal into the at least one monitoring area and the reception of the corresponding echo signals. The scanning signal can be a constant or a pulsed scanning signal here. A scanning signal can induce multiple echo signals depending on the object targets at which it is reflected. The echo signals can be received using the sensors in the direction of which they propagate. A direction of an object target relative to a sensor receiving an echo signal from the object target can be characterized by the main propagation direction of the corresponding echo signal. In this way, the directions of object targets can be detected more accurately.

Advantageously, at least one scanning signal can be emitted using only one of the sensors in at least one assignment sequence. In this way, superpositions of scanning signals and echo signals, which otherwise originate from different emitting sensors, can be avoided. The sensor direction variables can thus be determined more accurately. The at least one emitting sensor can be designated as "active".

Alternatively or additionally, no scanning signal can be emitted using at least one of the sensors in at least one assignment sequence. In this way, echo signals originating from this at least one sensor can be avoided.

Alternatively or additionally, at least one of the sensors, in particular at least one of the non-emitting sensors, can be operated in reception readiness for echo signals in at least one assignment sequence. In this way, echo signals which originate from the scanning signal of another one of the sensors can be received using the at least one reception-ready sensor. Non-emitting reception-ready sensors can be designated as "passive".

The emitting sensor can advantageously additionally be operated in reception readiness. The echo signals from its own scanning signal can thus be received using the emitting sensor. In this way, at least one sensor direction variable can also be determined for the emitting sensor. It is advantageously not necessary for the determination of the at least one sensor direction variable for the emitting sensor to assign its scanning signal and the corresponding reception signals received thereby to one another. It is not necessary to synchronize the emitting and the receiving using the same sensor. In this way, the assignment method according to the invention can be simplified.

Advantageously, only one of the sensors of the detection device can be actively controlled so that scanning signals can be emitted thereby. The other sensors of the detection device can be passively controlled, so that echo signals which originate from the scanning signals of the active emitting sensor can be received thereby. In this way, a direct assignment of scanning signals and echo signals can be omitted. It is not necessary to operate the sensors in a synchronized manner.

In a further advantageous embodiment of the method, the echo signals received using the respective sensors can be not brought into correlation with the at least one emitted scanning signal to assign the information channels in at least one assignment sequence and/or the at least one emitting sensor and the at least one reception-ready sensor can be not operated in a synchronized manner in at least one assignment sequence.

Advantageously, the echo signals received using the respective sensors can be not brought into correlation with the at least one emitted scanning signal for assignment of the information channels in at least one assignment sequence. In this way, the sensors do not have to be operated in a synchronized manner. A control effort in the assignment of the information channels can thus be reduced. The solely receiving sensors can advantageously be controlled permanently in reception readiness during the assignment phase without this having to be synchronized with the at least one emitting sensor.

Alternatively or additionally, the at least one emitting sensor and the at least one reception-ready sensor can be operated not in a synchronized manner. In this way, a control effort for carrying out the at least one assignment sequence can be further reduced.

In a further advantageous embodiment, multiple assignment sequences can be carried out and an assignment of the information channels of the at least two sensors and the defined mounting positions can be implemented from the results of at least a part of the assignment sequences, wherein scanning signals are emitted using the same at least one sensor in at least two assignment sequences and/or scanning signals are emitted using different sensors in at least two assignment sequences. In this way, the reliability of the assignment can be improved. The results of at least a part of the assignment sequences can advantageously be subjected to averaging so that the assignment becomes more accurate overall.

In a further advantageous embodiment of the method, at least one direction angle can be determined as the sensor direction variable of at least one sensor and/or at least one sensor direction variable of at least one sensor relative to at least one reference axis and/or at least one reference surface of the at least one sensor can be determined and/or at least one sensor direction variable can be implemented as the average of at least one object direction variable, wherein the at least one object direction variable characterizes the respective direction of a detected object target relative to the corresponding at least one sensor.

Direction variables in the form of direction angles can be compared easily and directly. Furthermore, direction angles can be brought easily into a sensor structure, in particular into a size-related sequence.

At least one sensor direction variable can be individually determined relative to a reference axis and/or a reference surface of the corresponding sensor. The at least one reference axis of at least one sensor can advantageously be a sensor axis which specifies the main emission direction and/or the main reception direction of the at least one sensor. Such reference axes can be uniquely defined.

Alternatively or additionally, at least one sensor direction variable can be implemented as an average of at least one object direction variable. An object direction variable specifies a direction of an object target, from which an echo signal comes, relative to the sensor, in particular relative to a reference area, especially to a reference axis and/or a reference surface of the sensor. In this way, in the method for assignment, in particular in at least one assignment sequence, the echo signals of multiple object targets can be used, in particular averaged. The sensor direction variables can thus be specified more accurately. For the case that a corresponding echo signal is detected using a sensor from only one object target in the monitoring area, the average of the object direction variable is this one object direction variable. The sensor direction variable then corresponds directly to this one object direction variable.

In a further advantageous embodiment of the method, a size-related sequence of the sensor direction variables, in particular the sensor direction angles, of the at least two sensors can be determined as at least one sensor structure and/or a sequence of the spatial arrangement of the defined mounting position can be specified as the position structure and/or, in the comparison of the at least one sensor structure and the at least one position structure, the information channels of the sensors can be assigned to the mounting positions in the size-related sequence of their respective sensor direction variables according to the sequence of the spatial arrangement of the defined mounting position of the sensors.

A size-related sequence of the sensor direction variables, in particular a size-related sequence of the direction angles, of the at least two sensors can advantageously be determined as the at least one sensor structure. In this way, sensor structures can be implemented which can be compared easily to position structures.

Alternatively or additionally, a sequence of the spatial arrangement of the defined mounting position can be specified as the position structure. In this way, the mounting positions can be unambiguously related to one another. The mounting positions can advantageously be brought into relation in accordance with their sequence along a line. The sequence of sensors arranged along a line can be uniquely specified.

Alternatively or additionally, upon the comparison of the at least one sensor structure and the at least one position structure, the information channels of the sensors can be assigned in the size-related sequence of their respective sensor direction variables to the mounting positions corresponding to the sequence of the spatial arrangement of the defined mounting position of the sensors. In this way, the information channels can be assigned with less effort to the respective mounting position.

In a further advantageous embodiment of the method, information channels between the sensors and at least one control device of the detection device can be assigned to the respective mounting positions and/or sensor direction variables can be at least partially determined using the respective sensors and/or sensor direction variables can be at least partially determined using at least one control device of the detection device from information obtained using the sensors and/or at least one sensor structure and/or the comparison of at least one sensor structure and at least one position structure can be implemented using at least one control device of the detection device.

At least parts of the detection device can be controlled using the at least one control device. At least one control device of the detection device can advantageously have means for controlling the detection device, in particular the sensors.

Alternatively or additionally, information, in particular direction variables, sensor structures, and position structures can be processed using the at least one control device. Alternatively or additionally, the control device can have means for evaluating and/or processing information which is obtained using the sensors. Alternatively or additionally, at least a part of the sensors can be controlled using the control device. The control device can advantageously be a control and evaluation device. Both control functions and evaluation functions can be implemented using the control and evaluation device.

Information channels between the sensors and at least one control device can advantageously be assigned to the respective mounting positions using the method. In this way, the information channels can be assigned on the part of the at least one control device to the respective mounting positions.

Alternatively or additionally, sensor direction variables can be at least partially determined using the respective sensors. In this way, the corresponding sensor direction variables can be determined in a decentralized manner with respect to the at least one control device. The sensor direction variables can be transmitted via the respective information channels to the at least one control device.

Alternatively or additionally, sensor direction variables can be at least partially determined using at least one control device of the detection device from information obtained using the sensors. In this way, means required for processing can be simplified on the part of the sensors. The evaluation of the variables can thus be carried out in a centralized manner using the at least one control device.

Alternatively or additionally, at least one sensor structure and/or the comparison of at least one sensor structure and at least one position structure can be implemented using at least one control device of the detection device. In this way, means present in the control device, in particular processors or the like, can be used.

At least a part of the functions and/or at least a part of the components of the at least one control device of the detection device can advantageously be implemented in a centralized or decentralized manner. In this way, the functions and/or the components can be implemented more flexibly.

At least a part of the functions and/or the components of the control device and the sensors can advantageously be combined. In this way, an expenditure, in particular a component expenditure, a mounting expenditure, a space requirement, and/or a cost expenditure can be reduced.

At least a part of the functions of the at least one control device and/or the sensors can advantageously be implemented in software and/or hardware. In this way, the functions can be adapted better to the operating requirements.

In a further advantageous configuration of the method, at least a part of the information channels can be implemented as physical connections and/or virtual connections between the sensors and at least one control device of the detection device.

At least a part of the information channels can advantageously be implemented using physical connections, in particular electric lines, light guides, or the like. In this way, the information can be transmitted between the sensors and the at least one control device on the basis of corresponding signals, in particular electric signals and/or light signals.

Alternatively or additionally, at least a part of the information channels can be implemented using virtual connections. The information channels can be implemented here in the form of coding of the information exchanged between the sensors and the control device. The information which is associated with one of the sensors can be coded for or using the sensor so that the coded information can be uniquely assigned to this sensor on the part of the at least one control device. The coding thus defines the information channel associated with the sensor. A physical connection, in particular at least one electric line, a CAN bus, or the like can be used for the transmission of the correspondingly coded information.

Furthermore, the object is achieved according to the invention in the detection device in that the at least one assignment means has means for determining at least one respective sensor direction variable, which characterizes at least one direction of at least one object target detected using the respective sensor relative to at least one sensor reference area of the respective sensor, by means of the respective received echo signals, for determining at least one sensor structure for at least a part of the information channels of the at least two sensors by means of at least one sensor direction variable in each case, wherein the at least one sensor structure characterizes the relative positions of the at least two sensors to one another, for comparing at least one sensor structure and at least one position structure, wherein the at least one position structure characterizes relative positions of at least a part of the mounting positions to one another, and for assigning at least one information channel to at least one of the mounting positions of the sensors from the comparison of the at least one sensor structure and the at least one position structure.

According to the invention, the detection device has at least one assignment means, using which sensor direction variables for the object targets detected using the sensors can be determined and at least one sensor structure can be implemented between the sensor direction variables. Furthermore, using the at least one assignment means, the at least one sensor structure and at least one position structure between the defined mounting positions can be compared and an assignment of at least one of the information channels of the at least two sensors to the respective defined mounting position can be implemented from the comparison.

The detection device can advantageously have means for carrying out the method according to the invention. In this way, information channels and mounting positions of the sensors can be assigned using the method according to the invention.

The at least one assignment means, in particular the means for carrying out the method according to the invention, can advantageously be implemented in software and/or hardware. Upon implementation in software, components present in any case can be used.

In one advantageous embodiment, at least a part of the information channels can be implemented as physical connections, in particular lines, and/or at least a part of the information channels can be implemented as virtual connections, in particular by means of coding of transmitted information. In this way, exclusively physical information channels, exclusively virtual information channels, and/or combinations of physical and virtual information channels can be assigned to defined mounting positions using the method according to the invention.

In a further advantageous embodiment, the at least two mounting positions can be arranged along a line. In this way, the position structure between the mounting positions can be specified more precisely. The information channels can thus be assigned better, in particular more easily and/or uniquely, to the mounting positions.

The at least two sensors can advantageously be arranged in defined mounting positions of a vehicle, in particular along a bumper. In this way, objects or object targets, respectively, can be located more accurately in the monitoring area using the sensors. In normal operation of the detection device, distances, directions, and/or velocities of object targets relative to the detection device, in particular to the sensors, can thus be determined more accurately.

Furthermore, the object is achieved according to the invention in the vehicle in that the at least one assignment means has means for determining at least one respective sensor direction variable, which characterizes at least one direction of at least one object target detected using the respective sensor relative to at least one sensor reference area of the respective sensor, by means of the respective received echo signals, for determining at least one sensor structure for at least a part of the information channels of the at least two sensors by means of at least one sensor direction variable in each case, wherein the at least one sensor structure characterizes the relative positions of the at least two sensors to one another, for comparing at least one sensor structure and at least one position structure, wherein the position structure characterizes the relative positions of at least a part of the mounting positions to one another, and for assigning at least one information channel to at least one of the mounting positions of the sensors from the comparison of the at least one sensor structure and the at least one position structure.

According to the invention, the vehicle has at least one detection device having multiple sensors, the information channels of which are assigned to uniquely defined mounting positions of the sensors by means of the method according to the invention.

At least one monitoring area outside the vehicle and/or inside the vehicle can be monitored using the at least one detection device, in particular for objects.

The vehicle can advantageously have at least one detection device according to the invention. In this way, the mounting positions of the sensors on the vehicle can be assigned better to the information channels.

In an advantageous embodiment, the vehicle can have at least one driver assistance system. The vehicle can be operated autonomously or semiautonomously with the aid of a driver assistance system.

Advantageously, at least one detection device can be functionally connected to at least one driver assistance system. In this way, information about a monitoring area, in particular object information, in particular distances, directions, and/or velocities of objects relative to the vehicle, which are determined using the at least one detection device, can be used with the at least one driver assistance system for controlling an autonomous or semiautonomous operation of the vehicle.

Moreover, the features and advantages indicated in connection with the method according to the invention, the detection device according to the invention, and the vehicle according to the invention, and the respective advantageous embodiments thereof, apply in a mutually corresponding manner and vice versa. The individual features and advantages can of course be combined with one another, wherein further advantageous effects that go beyond the sum of the individual effects may result.

BRIEF DESCRIPTION OF THE DRAWINGS

Further advantages, features and details of the invention will become apparent from the following description, in which exemplary embodiments of the invention are explained in more detail with reference to the drawing. A person skilled in the art will expediently also consider individually the features that have been disclosed in combination in the drawing, the description and the claims and will combine them to form meaningful further combinations. In the schematic figures.

In the figures, identical components are provided with identical reference signs.

EMBODIMENT(S) OF THE INVENTION

Figures 1, 2:
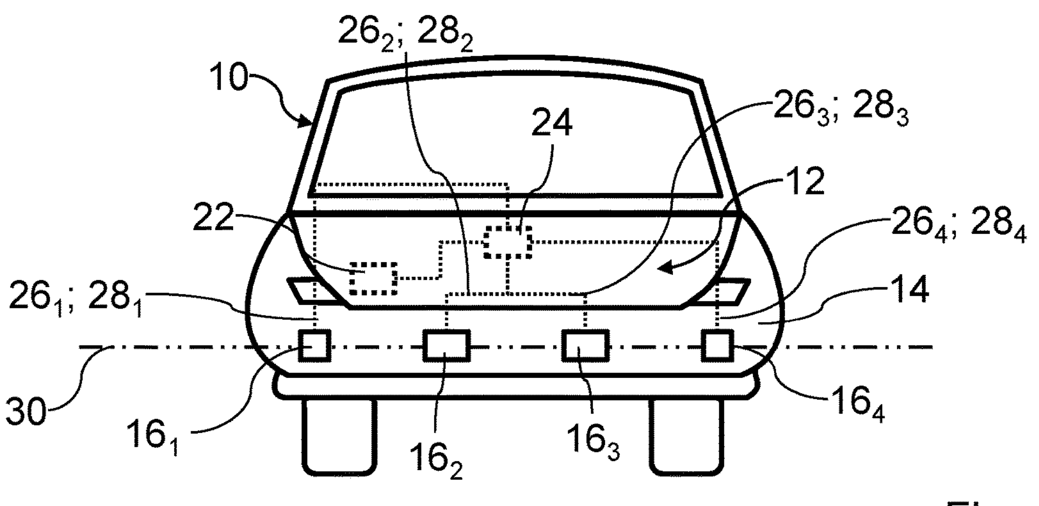
FIG. 1 shows a front view of a vehicle having a driver assistance system and a radar system having four radar sensors for detecting objects in the direction of travel in front of and diagonally adjacent to the vehicle.
FIG. 2 shows a schematic bottom view of the front bumper of the vehicle having the four radar sensors of the radar system from FIG. 1, using which four objects are detected.

FIG. 1 shows the front view of a vehicle 10, for example in the form of a passenger vehicle.

The vehicle 10 has a detection device, for example in the form of a radar system 12. FIG. 2 shows a schematic bottom view of a front bumper 14 of the vehicle 10 having four radar sensors 16, respectively $\mathbf{16}_1$, $\mathbf{16}_2$, $\mathbf{16}_3$, and $\mathbf{16}_4$, of the radar system 12 in a situation having four objects $\mathbf{20}_c$, for example, $\mathbf{20}_a$, $\mathbf{20}_b$, $\mathbf{20}_c$, and $\mathbf{20}_d$ respectively.

A monitoring area 18 in front of and diagonally adjacent to the vehicle 10 in the travel direction can be monitored for objects 20 using the radar system 12. The radar sensors 16 of the radar system 12 are arranged, for example, in the front bumper of the vehicle 10. The radar sensors 16 can also be arranged at other positions on the vehicle 10 and oriented differently. The radar sensors 16 can also be arranged so that the interior of the vehicle 10 can be monitored using the radar system 12.

The radar system 12 can be used to determine object information, for example, distances, directions, and velocities of objects 20 relative to the vehicle 10 or to the radar sensors 16, respectively, or corresponding characterizing variables. Gestures of persons, for example, can also be detected using the radar system 12 or the radar sensors 16, respectively.

The objects 20 can be stationary or moving objects, for example other vehicles, persons, animals, plants, obstacles, roadway irregularities, for example potholes or rocks, roadway boundaries, traffic signs, open spaces, for example parking spaces, precipitation or the like.

The radar system 12 is connected to a driver assistance system 22 of the vehicle 10. The driver assistance system 22 can be used to operate the vehicle 10 autonomously or semiautonomously.

The radar system 12 comprises, for example, the four radar sensors $\mathbf{16}_1$, $\mathbf{16}_2$, $\mathbf{16}_3$, and $\mathbf{16}_4$ and a control and evaluation device 24.

For better distinguishing capability, in the description and in FIGS. 1 and 2, the elements connected to the radar sensors $\mathbf{16}_1$, $\mathbf{16}_2$, $\mathbf{16}_3$, and $\mathbf{16}_4$ in FIGS. 1 and 2, namely connecting lines 26, information channels 28, sensor axes 32, echo signals 36, and direction angles 40 are each provided with the same indices between 1 and 4 as the corresponding radar sensors, respectively $16_1$, $16_2$, $16_3$, and $16_4$.

Information is exchanged between the control and evaluation device 24 and the respective radar sensors $16_1$, $16_2$, $16_3$, and $16_4$ using the connecting lines $26_1$, $26_2$, $26_3$, and $26_4$. The connecting lines $26_1$, $26_2$, $26_3$, and $26_4$ are in this regard physical information channels 28, which are provided hereinafter with the reference signs $28_1$, $28_2$, $28_3$, and $28_4$ corresponding to the associated connecting lines $26_1$, $26_2$, $26_3$, and $26_4$.

The exchangeable information is data and control information, using which the radar sensors $16_1$, $16_2$, $16_3$, and $16_4$ can be controlled. Furthermore, the information obtained using the radar sensors $16_1$, $16_2$, $16_3$, and $16_4$ can be transmitted via the information channels $28_1$, $28_2$, $28_3$, and $28_4$ to the control and evaluation device 24 and evaluated thereby. The radar sensors 16 can be controlled separately from one another. In addition, the information obtained using the radar sensors $16_1$, $16_2$, $16_3$, and $16_4$ can be evaluated separately from one another.

The radar sensors $16_1$, $16_2$, $16_3$, and $16_4$ are arranged adjacent to one another along an imaginary line 30 in the bumper 14. Each of the radar sensors $16_1$, $16_2$, $16_3$, and $16_4$ is arranged in a defined mounting position 38. The mounting positions 38 are designated for better distinguishing capability in accordance with their position in the bumper 14 with the indices “l” for “left”, “zl” for “center left”, “zr” for “center right”, and “r” for “right”, thus with $38_l$, $38_{zl}$, $38_{zr}$, and $38_r$.

The mounting positions $38_l$, $38_{zl}$, $38_{zr}$, and $38_r$ are implemented, for example, in the form of defined specified installation openings for the radar sensors $16_1$, $16_2$, $16_3$, and $16_4$ in the bumper 14. The assignment of the mounting positions $38_l$, $38_{zl}$, $38_{zr}$, and $38_r$ to the information channels $28_1$, $28_2$, $28_3$, and $28_4$ and the radar sensors $16_1$, $16_2$, $16_3$, and $16_4$ on the part of the control and evaluation device 24 is performed using a method described hereinafter for assignment.

The two middle radar sensors $16_2$ and $16_3$ are directed with their respective sensor axes $32_2$ and $32_3$ in the direction of a longitudinal axis of the vehicle 10, in particular into the monitoring area 18. The two outer radar sensors $16_1$ and $16_4$ are oriented outward to their respective side with their respective sensor axis $32_1$ and $32_4$ by approximately 45° in each case in relation to the longitudinal axis of the vehicle 10.

Each of the radar sensors 16 comprises an emitting device for emitting scanning signals in the form of radar signals 34 and a receiving device for receiving echo signals 36, which originate from radar signals 34 that were reflected on objects 20.

The radar signals 34 are reflected on reflective areas of the respective objects $20_c$, which are designated as object targets 21. An object 20 can have multiple object targets 21, on which radar signals 34 are reflected in different directions and thus induce echo signals 36 having different main propagation directions. In each of the objects 20 in FIG. 2, only one object target 21 is designated by way of example for better clarity.

Each of the radar sensors $16_1$, $16_2$, $16_3$, and $16_4$ can be controlled using the control and evaluation device 24 so that it is only activated to emit radar signals 34. In addition, each of the radar sensors $16_1$, $16_2$, $16_3$, and $16_4$ can be controlled so that it does not emit radar signals 34, but is ready to receive echo signals 36. In addition, the radar sensors $16_1$, $16_2$, $16_3$, and $16_4$ can also be activated separately from one another to emit radar signals 34 and can also be ready to receive echo signals 36, which each originate from their own radar signals 34. Moreover, with corresponding control, the echo signals 36 which originate from radar signals 34 of one of the other radar sensors $16_1$, $16_2$, $16_3$, and $16_4$ can be received using each radar sensor $16_1$, $16_2$, $16_3$, or $16_4$. The radar sensors $16_1$, $16_2$, $16_3$, and $16_4$ can thus be operated in a synchronized or non-synchronized manner with corresponding control by the control and evaluation unit 24.

The control and evaluation device 24 can be implemented separately from the radar sensors $16_1$, $16_2$, $16_3$, and $16_4$, for example, as part of a control electronics unit of the vehicle 10. For example, the functions and components of the control and evaluation device 24 are centrally implemented. Alternatively, a part of the functions and/or the components can also be implemented in a decentralized manner, for example, also in connection with the radar sensors $16_1$, $16_2$, $16_3$, and $16_4$.

For mounting the radar system 12, the four radar sensors $16_1$, $16_2$, $16_3$, and $16_4$ are each arranged in one of the defined mounting positions $38_l$, $38_{zl}$, $38_{zr}$, and $38_r$ in the bumper 14. The control and evaluation device 24, if it is not already an integral part of the vehicle 10, in particular of the control device of the vehicle 10, is mounted in the vehicle 10. The connecting lines 26 are connected, on the one hand, to the radar sensors 16 and, on the other hand, to the control and evaluation device 24. Since subsequently the information channels 28 implemented using the connecting lines 26 are assigned to the mounting position 34 using the assignment method, a sequence or assignment does not have to be observed during the connection of the connecting line 26. The mounting is thus simplified overall.

The information channels $28_1$, $28_2$, $28_3$, and $28_4$ are then assigned on the part of the control and evaluation device 24 to the respective mounting positions $38_l$, $38_{zl}$, $38_{zr}$, and $38_r$. The assignment method will be described hereinafter.

The four objects $20_a$, $20_b$, $20_c$, and $20_d$ are arranged, for example, in front of and diagonally in front of the vehicle 10. More or fewer than four objects 20 can alternatively also be provided.

A first assignment sequence is then carried out by way of example with stationary vehicle 16 and static objects $20_a$, $20_b$, $20_c$, and $20_d$.

One of the radar sensors, for example, the third radar sensor $16_3$ from the left, is actuated here so that it emits radar signals 34 into the monitoring area 18. The other three radar sensors, namely the radar sensors $16_1$, $16_2$, and $16_4$, do not emit radar signals 34. All four radar sensors $16_1$, $16_2$, $16_3$, and $16_4$ are actuated in reception readiness to receive echo signals 36, which originate from the radar signal 34 of the emitting radar sensor $16_3$.

In FIG. 2, the designations of the echo signals 36 are each designated with a first index between 1 and 4 for better distinguishing capability, which corresponds to the index of that radar sensor $16_1$, $16_2$, $16_3$, and $16_4$ by which echo signal 36 is received, and a second index between a and d, which corresponds to the index of the object $20_a$, $20_b$, $20_c$, or $20_d$ or the index of the object target $21_a$, $21_b$, $21_c$, or $21_d$, respectively, at which the radar signal 34 is reflected. The echo signals 36 are each shown as an arrow in FIG. 2, which indicates the main propagation direction of the respective echo signal 36.

The first radar sensor $16_1$ receives the echo signals $36_{1,a}$, $36_{1,b}$, and $36_{1,c}$, which come from the three objects $20_a$, $20_b$, and $20_c$ located on the left.

Echo signals 36 from radar signals 34, which are reflected on the two right objects $20_c$ and $20_d$ in FIG. 2, cannot be received due to the reflection angle using the first radar sensor $16_1$, on the left in FIG. 2.

The echo signals $36_{2,b}$ and $36_{1,c}$, which come from the two centrally located objects $20_b$ and $20_c$, are received using the second radar sensor $16_2$. The echo signals 36 of radar signals 34, which are reflected on the two outer objects $20_a$ and $20_d$, cannot be received using the second radar sensor $16_2$ due to the reflection angle.

The echo signals $36_{3,b}$, $36_{3,c}$, and $36_{3,d}$, which come from the three objects $20_b$, $20_c$, and $20_d$ located on the right, are received using the third radar sensor $16_3$, using which the radar signals 34 are emitted. Echo signals 36 of radar signals 34, which are reflected on the object $20_a$ located on the left, cannot be received using the third radar sensor $16_3$ due to the reflection angle.

Echo signals $36_{4,c}$ and $36_{4,d}$, which come from the two objects $20_c$ and $20_d$ located on the right, are received using the fourth radar sensor $16_4$, on the right in FIG. 2. Echo signals 36 from radar signals 34, which are reflected on the two objects $20_a$ and $20_b$ located on the left, cannot be received due to the reflection angle using the fourth radar sensor $16_4$.

For each of the radar sensors $16_1$, $16_2$, $16_3$, and $16_4$, a respective direction variable in the form of a direction angle 40 is determined from the echo signals 36 received using the respective radar sensor $16_1$, $16_2$, $16_3$, and $16_4$ for the respective detected objects $20_c$, which direction variable characterizes the direction of the detected object 20 relative to the sensor axis $32_a$, $32_b$, $32_c$, or $32_a$ of the corresponding radar sensor $16_1$, $16_2$, $16_3$, or $16_4$.

In FIG. 2, for better distinguishing capability, the direction angle 40 is designated corresponding to the associated echo signals 36 in each case with the first index between 1 and 4 and the second index between a and d. Only the direction angles $40_{1,a}$ and $40_{1,b}$ for the first radar sensor $16_1$ are shown by way of example in FIG. 2. The direction angle $40_{1,a}$ is associated with the echo signal $36_{1,a}$, which is reflected on the left object $20_a$. The direction angle $40_{1,b}$ is associated with the echo signal $36_{1,b}$, which is reflected on the second object $20_b$.

The direction angles 40 are transmitted via the respective information channels 28 to the control and evaluation device 24. The respective direction angles 40 coming from the radar sensors 16 are thus directly assigned on the part of the control and evaluation device 24 to the respective information channels 28.

For each radar sensor 16, a respective average direction angle $40_{AV}$ is determined from the respective direction angles 40 associated therewith. Overall, four average direction angles $40_{AV,1}$, $40_{AV,2}$, $40_{AV,3}$, and $40_{AV,4}$ are determined for the four radar sensors $16_1$, $16_2$, $16_3$, and $16_4$. For better clarity, the designations are each provided with the same index between 1 and 4 as the corresponding radar sensor $16_1$, $16_2$, $16_3$, and $16_4$.

The average direction angles $40_{AV,1}$, $40_{AV,2}$, $40_{AV,3}$, and $40_{AV,4}$ each characterize an average direction 42, namely $42_1$, $42_2$, $42_3$, and $42_4$, of the objects 20 detected using the respective radar sensor $16_1$, $16_2$, $16_3$, and $16_4$, or the respective object targets 21, relative to the respective sensor axis $32_1$, $32_2$, $32_3$, and $32_4$. In FIG. 2, the average directions $42_1$, $42_2$, $42_3$, and $42_4$ are each indicated with dashed straight lines. In cases in which only one object target 21 is detected using one of the radar sensors $16_1$, $16_2$, $16_3$, and $16_4$, the average direction angle $40_{AV}$ corresponds to the single direction angle 40 determined using the corresponding radar sensor 16.

For example, the average direction $42_1$ and the average direction angle $40_{AV,1}$ between the average direction $42_1$ and the first sensor axis $32_1$ are determined for the first radar sensor $16_1$ from the two direction angles $40_{1,a}$ and $40_{1,b}$, which characterize the directions to the object targets $21_a$ and $21_b$ of the two left objects $20_a$ and $20_b$ relative to the sensor axis $32_1$ of the first radar sensor $16_1$. The determination of the respective average direction angle $40_{AV}$ for the other three radar sensors $16_2$, $16_3$, and $16_4$ is carried out analogously.

For the exemplary arrangement shown in FIG. 2, −40° results for the average direction angle $40_{AV,1}$ of the first sensor $16_1$. For the average direction angle $40_{AV,2}$ of the second radar sensor $16_2$, −14° results. For the average direction angle $40_{AV,3}$ of the third radar sensor $16_3$, 13° results. For the average direction angle $40_{AV,4}$ of the right radar sensor $16_4$, 55° results.

Since the direction angles 40 are assigned to the respective information channels 28, as already explained, the respective average direction angles $40_{AV}$ are also directly assigned to the corresponding information channels 28. The respective assigned average direction angles $40_{AV}$, information channels 28, and radar sensors 16 are shown by way of example in a box on the left side in FIG. 3.

Figure 3:
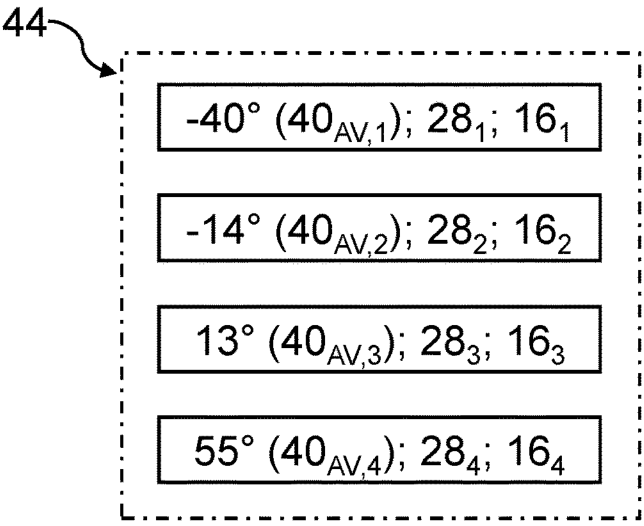
FIG. 3 shows a sensor structure in the form of a size-related sequence of average direction angles, which characterize average directions of the objects detected using the four radar sensors from FIGS. 1 and 2 relative to the radar sensors.

A sensor structure 44 in the form of a size-related sequence of the average direction angles $40_{AV}$ is determined from the determined average direction angles $40_{AV}$. In FIG. 3, the four boxes having the respective average direction angles $40_{AV}$, the information channels 28, and the radar sensors 16 are arranged from top to bottom with increasing average direction angles $40_{AV}$ by way of example for explanation.

In this phase of the assignment method, it is not yet known on the part of the control and evaluation device 24 in which of the mounting positions $38_l$, $38_{zl}$, $38_{zr}$, and $38_r$ the respective radar sensors $16_1$, $16_2$, $16_3$, or $16_4$ are arranged and with which of the mounting positions $38_l$, $38_{zl}$, $38_{zr}$, and $38_r$ the corresponding information channels $28_1$, $28_2$, $28_3$, and $28_4$ are associated.

In order to assign the mounting positions $38_l$, $38_{zl}$, $38_{zr}$, and $38_r$ to the respective radar sensors $16_1$, $16_2$, $16_3$, and $16_4$ and the information channels $28_1$, $28_2$, $28_3$, and $28_4$, the sensor structure 44 is compared to a position structure 46 of the mounting positions $38_l$, $38_{zl}$, $38_{zr}$, and $38_r$.

The position structure 46 is implemented in the form of the sequence of the spatial arrangement of the mounting positions $38_l$, $38_{zl}$, $38_{zr}$, and $38_r$ from left to right along the line 30. The position structure 46 is, for example, stored in the control and evaluation device 24.

Figure 4:
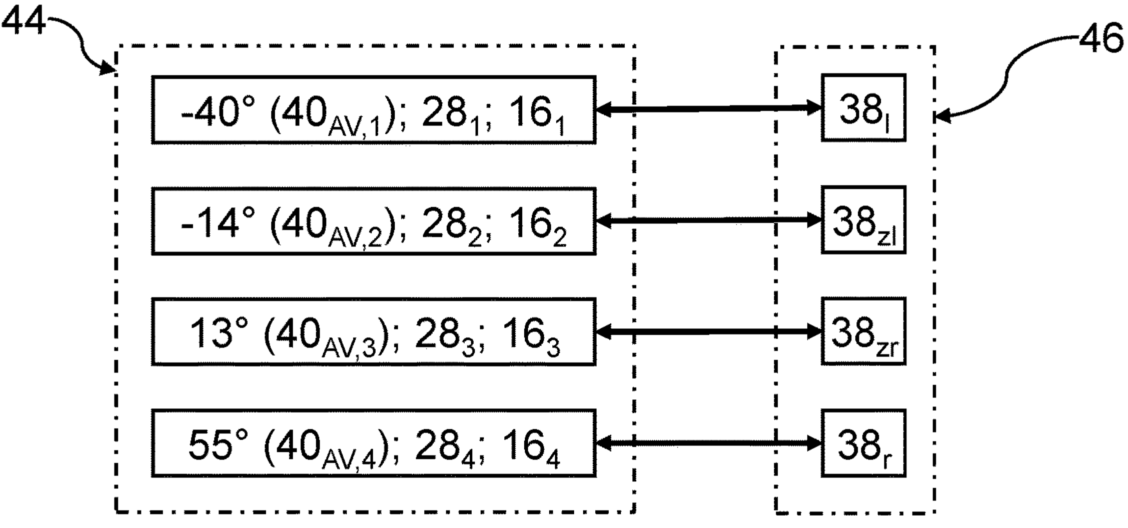
FIG. 4 shows a comparison of the sensor structure from FIG. 3 and a position structure in the form of a sequence of the spatial arrangement of mounting positions in which the four radar sensors from FIGS. 1 and 2 are arranged.

The comparison of the sensor structure 44 and the position structure 46 is indicated by way of example in FIG. 4. The sensor structure 44 corresponding to FIG. 3 is shown on the left side. On the right side, four boxes having the mounting positions $38_l$, $38_{zl}$, $38_{zr}$, and $38_r$ corresponding to their sequence in the bumper 14 from left to right are shown by way of example from top to bottom.

The information channels $28_1$, $28_2$, $28_3$, and $28_4$ are assigned via the size-related sequence of the average direction angles $40_{AV,1}$ to $40_{AV,4}$ transmitted using them to the respective sequence of the mounting positions $38_l$, $38_{zl}$, $38_{zr}$, and $38_r$. The assignment is indicated with double arrows in each case in FIG. 4.

The assignment enables, in normal operation of the radar system 12, the information detected using the respective radar sensors $16_1$, $16_2$, $16_3$, or $16_4$ from the monitoring area 18, or information from the objects 20 present there, to be brought together and thus overall information about the monitoring area 18 to be determined.

Further assignment sequences can optionally be carried out in the assignment method. In further assignment sequences, the radar sensors $\mathbf{16}_1$, $\mathbf{16}_2$, $\mathbf{16}_3$, and $\mathbf{16}_4$ can be repeatedly actuated in the above-described manner. Alternatively or additionally, in different assignment sequences, different ones of the radar sensors $\mathbf{16}_1$, $\mathbf{16}_2$, or $\mathbf{16}_4$ can also act as the respective emitting radar sensor 16 and the radar sensor $\mathbf{16}_3$ described at the outset can only be actuated in reception readiness. The determined results can be checked and validated using multiple assignment sequences.

After the assignment of the information channels $\mathbf{28}_1$, $\mathbf{28}_2$, $\mathbf{28}_3$, and $\mathbf{28}_4$ to the mounting position $\mathbf{38}_l$, $\mathbf{38}_{zl}$, $\mathbf{38}_{zr}$, and $\mathbf{38}_r$ of the radar sensors $\mathbf{16}_1$, $\mathbf{16}_2$, $\mathbf{16}_3$, or $\mathbf{16}_4$, the radar system 12 is operationally ready for normal operation.

In normal operation of the radar system 12, all radar sensors $\mathbf{16}_1$, $\mathbf{16}_2$, $\mathbf{16}_3$, and $\mathbf{16}_4$ are activated separately in each case to emit radar signals 34 and to receive echo signals 36. The radar sensors $\mathbf{16}_1$, $\mathbf{16}_2$, $\mathbf{16}_3$, or $\mathbf{16}_4$ are operated in a synchronized manner, so that the echo signals 36 can be assigned to the respective radar signals 34. The information about the monitoring area 18 obtained with the aid of the radar sensors $\mathbf{16}_1$, $\mathbf{16}_2$, $\mathbf{16}_3$, and $\mathbf{16}_4$, for example, distances, directions, and velocities of objects 20 relative to the vehicle 10, are then brought together using the control and evaluation device 24 and transmitted accordingly to the driver assistance system 22.

The invention claimed is:

1. A method for assigning information channels of at least two sensors to a detection device on the part of at least one control device of the detection device,
- wherein each sensor is mounted in defined mounting positions relative to one another,
- wherein the detection device is provided for monitoring at least one monitoring area in connection with at least one vehicle,
- the method comprising:
- emitting at least one scanning signal into at least one monitoring area using at least one of the sensors,
- receiving at least one echo signal of at least one scanning signal reflected on at least one object target of at least one object in at least one monitoring area using at least two of the sensors,
- determining at least one direction variable using at least one echo signal,
  - wherein the direction variable characterizes a respective direction of a reflecting object target relative to at least one reference area of the detection device,
- assigning at least one information channel of at least one of the mounting positions of the sensors using at least one direction variable,
- wherein for at least two of the sensors and their respective information channels, at least one respective sensor direction variable is determined in each case by the respective received echo signals,
- wherein the sensor direction variable characterizes at least one direction of at least one object target detected using the respective sensor relative to a sensor reference area of the respective sensor, by at least one sensor direction variable in each case,
- determining at least one sensor structure for at least a part of the information channels of the at least two sensors, which characterizes the relative positions of the at least two sensors to one another, wherein determining the at least one sensor structure comprises ordering the at least two sensors based on the at least one respective sensor direction variable,
- comparing at least one sensor structure and at least one position structure,
  - wherein the at least one position structure characterizes relative positions of at least a part of the defined mounting positions to one another, and
- from the comparison of the at least one sensor structure and the at least one position structure, assigning at least one information channel to at least one of the mounting positions of the sensors.

2. The method as claimed in claim 1,
- wherein a scanning signal is emitted using only one of the sensors in at least one assignment sequence, or
- no scanning signal is emitted using at least one of the sensors in at least one assignment sequence and
- at least one of the non-emitting sensors is operated in reception readiness for echo signals in at least one assignment sequence.

3. The method as claimed in claim 2,
- wherein the echo signals received using the respective sensors for assignment to the information channels are not brought into correlation with the at least one emitted scanning signal in at least one assignment sequence and
- wherein the at least one emitting sensor and the at least one reception-ready sensor are not operated in a synchronized manner in at least one assignment sequence.

4. The method as claimed in claim 1, further comprising:
- carrying out multiple assignment sequences, and
- implementing an assignment of the information channels of the at least two sensors and the defined mounting positions from the results of at least a part of the assignment sequences,
- wherein scanning signals are emitted using the same at least one sensor in at least two assignment sequences or scanning signals are emitted using different sensors in at least two assignment sequences.

5. The method as claimed in claim 1, further comprising:
- determining at least one direction angle as the sensor direction variable of at least one sensor,
- determining at least one sensor direction variable of at least one sensor relative to at least one reference axis, and/or at least one reference surface of the at least one sensor, and
- implementing at least one sensor direction variable as the average of at least one object direction variable,
- wherein the at least one object direction variable characterizes the respective direction of a detected object target relative to the corresponding at least one sensor.

6. The method as claimed in claim 1, further comprising:
- determining the sensor direction angles of the at least two sensors as at least one sensor structure,
- specifying a sequence of the spatial arrangement of the defined mounting position as the position structure, and
- upon the comparison of the at least one sensor structure and the at least one position structure, assigning the information channels of the sensors in a size-related sequence of their respective sensor direction variables in accordance with the sequence of the spatial arrangement of the defined mounting position of the sensors to the mounting positions.

7. The method as claimed in claim 1, further comprising:
- assigning information channels between the sensors and at least one control device of the detection device to the respective mounting positions, at least partially determining sensor direction variables using the respective sensors, at least partially determining sensor direction variables using at least one control device of the detection device from information obtained using the sensors and/or at least one sensor structure, and implementing the comparison of at least one sensor structure and at least one position structure using at least one control device of the detection device.

8. The method as claimed in claim 1, further comprising:

implementing at least a part of the information channels as physical connections or virtual connections between the sensors and at least one control device of the detection device.

9. A detection device for monitoring at least one monitoring area, in connection with at least one vehicle, wherein the detection device comprises:

at least two sensors, which are arranged in defined mounting positions relative to one another, at least one control device, which can communicate via respective information channels with the sensors, and at least one assignment means for assigning at least one of the information channels to at least one of the mounting positions of one of the sensors, wherein the at least one assignment means comprises means for determining at least one respective sensor direction variable, wherein the at least one sensor direction variable characterizes at least one direction of at least one object target detected using the respective sensor relative to at least one sensor reference area of the respective sensor, using respective received echo signals, wherein the characterization of the at least one direction of the at least one object target is used for determining at least one sensor structure for at least a part of the information channels of the at least two sensors using at least one sensor direction variable in each case, wherein determining the at least one sensor structure comprises ordering the at least two sensors based on the at least one respective sensor direction variable, wherein the at least one sensor structure characterizes the relative positions of the at least two sensors to one another, for comparing at least one sensor structure and at least one position structure, wherein the at least one position structure characterizes relative positions of at least a part of the mounting positions to one another for assigning at least one information channel to at least one of the mounting positions of the sensors from the comparison of the at least one sensor structure and the at least one position structure.

10. The detection device as claimed in claim 9, wherein at least a part of the information channels is implemented as physical lines, and at least a part of the information channels is implemented as virtual connections by coding of transmitted information.

11. The detection device as claimed in claim 9, wherein the at least two mounting positions are arranged along a line.

12. A vehicle comprising at least one detection device for monitoring at least one monitoring area, wherein the at least one detection device comprises:

at least two sensors, which are arranged in defined mounting positions relative to one another, at least one control device, which is able to communicate via respective information channels with the sensors, and at least one assignment means for assigning at least one of the information channels to at least one of the mounting positions of one of the sensors wherein the at least one assignment means comprises means for determining at least one respective sensor direction variable, wherein the at least one respective sensor direction variable characterizes at least one direction of at least one object target detected using the respective sensor relative to at least one sensor reference area of the respective sensor, using respective received echo signals, for determining at least one sensor structure for at least a part of the information channels of the at least two sensors using at least one sensor direction variable in each case, wherein determining the at least one sensor structure comprises ordering the at least two sensors based on the at least one respective sensor direction variable, wherein the at least one sensor structure characterizes the relative positions of the at least two sensors to one another, for comparing at least one sensor structure and at least one position structure, wherein the position structure characterizes the relative positions of at least a part of the mounting positions to one another, for assigning at least one information channel to at least one of the mounting positions of the sensors from the comparison of the at least one sensor structure and the at least one position structure.

13. The vehicle as claimed in claim 12, wherein the vehicle comprises at least one driver assistance system.

* * * * *